United States Patent Office 2,750,405
Patented June 12, 1956

2,750,405

HYDROXYDEHYDROABIETIC ACID AND ESTERS THEREOF

Paul F. Ritchie, Wilmington, Del., assignor to Hercules Powder Company, Wilmington, Del., a corporation of Delaware No Drawing. Application June 18, 1952,
Serial No. 294,257

13 Claims. (Cl. 260—473)

This invention relates to a new hydroxy-substituted dehydroabietic acid and esters thereof and, more particularly, to 9-hydroxydehydroabietic acid and esters thereof and the preparation of these new products.

Hydroxydehydroabietic acids have been prepared in the past by chlorinating or sulfonating dehydroabietic acid and then heating the chloro- or sulfo-dehydroabietic acid with alkali. In each of these hydroxydehydroabietic acids the hydroxyl radical is attached to the benzenoid nucleus of the dehydroabietic acid.

Now, in accordance with this invention, it has been found that a heretofore unknown hydroxy derivative of dehydroabietic acid may be obtained by oxidizing an ester of dehydroabietic acid with an oxygen-containing gas in the presence of a free radical oxidation initiator, separating from the oxidate the ester of 9-hydroperoxydehydroabietic acid, and reducing the hydroperoxide by contacting it with a nonmetallic reducing agent to produce the corresponding ester of 9-hydroxydehydroabietic acid. The free acid, 9-hydroxydehydroabietic acid, may then be obtained by saponification of this ester. These new hydroxy derivatives of dehydroabietic acid are believed to have the following general formula:

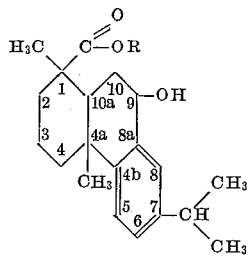

where R is hydrogen, alkyl, hydroxyalkyl, aryl, or aralkyl.

It has further been found that each of these 9-hydroxydehydroabietic acid esters, and the free acid, exists in two stereoisomeric forms of the type known as epimers. In one, named the α-epimeride herein, the hydroxy group has a trans configuration with reference to the methyl group in the 4a-position, and in the other, named the β-epimeride, the hydroxy group has a cis configuration with reference to the 4a-methyl group. Thus, 9-hydroxydehydroabietic acid exists in two forms, namely, 9α-hydroxydehydroabietic acid and 9β-hydroxydehydroabietic acid. In the same way, each of the esters exists in two forms, as, for example, methyl 9α-hydroxydehydroabietate and methyl 9β-hydroxydehydroabietate, ethyl 9α-hydroxydehydroabietate and ethyl 9β-hydroxydehydroabietate, etc.

The following examples illustrate the preparation of the new products, 9-hydroxydehydroabietic acid and esters therefore, in accordance with this invention, and the isolation of the two epimeric forms of these products. Unless otherwise indicated, all quantities are on the basis of parts by weight.

Example 1

Methyl dehydroabietate was oxidized by passing oxygen through the molten ester, held at about 77° C. during the oxidation, in the presence of about 2% benzoyl peroxide for 28 hours. The oxidate so obtained contained 52.0% hydroperoxides. Sixty parts of this oxidate was dissolved in 400 parts of a 10% aqueous methanol solution and subjected to countercurrent extraction with an equal volume of hexane through a series of twenty-five equilibrations. The fraction recovered from the 10% aqueous methanol solution amounted to 35 parts of the total oxidate and contained 5.0% hydroperoxides. The fraction recovered from the hexane solution amounted to 66% of the total oxidate and contained 81.3% hydroperoxides. The latter fraction was then dissolved in 400 parts of a 20% aqueous methanol solution and subjected to countercurrent extraction with an equal volume of hexane. The fraction recovered from the aqueous methanol solution amounted to 34% of the previous hydroperoxide-rich fraction and contained 92.7% hydroperoxides. The fraction recovered from the hexane solution amounted to 32% of the previous hydroperoxide-rich fraction and contained 57.2% hydroperoxide. This fraction was then dissolved in methanol and the solution held at 0°–20° C., whereby a yield of 18% of crystalline methyl 9-hydroperoxydehydroabietate was obtained, based on the hydroperoxide content of the oxidized ester. This hydroperoxide had a melting point of 132.5°–133.5° C.

To a rapidly agitated solution of 1.5 parts of the above methyl 9-hydroperoxydehydroabietate dissolved in 50 parts of methanol was added, during a period of 2 hours, 1.5 parts of sodium sulfide dissolved in 50 parts of a 1:1 mixture of water and methanol. When the addition of the sodium sulfide solution was complete, the reaction mixture was heated at 50° C. for 3 hours, after which it was poured into 7 volumes of water. The product was extracted with ether and the ethereal solution was washed with water and dried over anhydrous sodium sulfate. The ether was removed by distillation whereby a white crystalline product was obtained as a residue. On recrystallization from aqueous methanol, the methyl 9-hydroxydehydroabietate was obtained in the form of white needles having a melting point of 111°–112° C.

Example 2

Five parts of methyl 9-hydroperoxydehydroabietate (M. P. 132.5°–133.5° C.) was dissolved in 400 parts of dry isopropanol. Twenty parts of glacial acetic acid was added and the solution heated to reflux temperature, at which point 5 parts of sodium iodide in 50 parts of isopropanol was added, and the heating was continued at the reflux temperature for 10 minutes. After adding 50 parts of water to the reaction mixture, the released iodine was destroyed by the addition of an equivalent amount of a normal aqueous solution of sodium thiosulfate. The reaction mixture was then poured into several volumes of water and the product was extracted with ether. After washing the ether solution with water and drying it with anhydrous sodium sulfate, the product was recovered by removal of the ether. The methyl 9-hydroxydehydroabietate so obtained was crystallized from hexane and then recrystallized from aqueous methanol, whereby white crystals having a melting point of 112°–112.5° C. were obtained. Carbon and hydrogen analyses showed this product to be the pure compound; found carbon 76.74%, hydrogen 9.41%; calculated carbon 76.32%, hydrogen 9.15%. The 3,5-dinitrobenzoate was prepared and crystallized to a constant melting point (163.5°–164.5° C.) from ethanol. The nitrogen content found was 5.30% as compared with 5.34% calculated. Methyl 9-hydroxydehydroabietate is only sparingly soluble in hexane, petroleum ether, or heptane but is soluble in most other organic solvents. It has a specific rotation of $[\alpha]_D + 17°$ (1% in ethanol).

*Example 3*

Twenty parts of a dehydrogenated commercial methyl abietate, and containing 49% of methyl dehydroabietate, was oxidized with molecular oxygen in the presence of 0.750 part of benzoyl peroxide at 80° C. After 6.5 hours, the reaction mixture had absorbed 32.2 mole per cent of oxygen and on analysis was found to contain 20.6 mole per cent of hydroperoxide.

A portion of this oxidate (15.6 parts) was dissolved in 250 parts of methanol. The solution was agitated and a solution of 3.0 parts of sodium sulfide in 100 parts of a 1:1 mixture of methanol and water was added dropwise during a period of 1.5 hours. After heating the reaction mixture to reflux temperature for 1.5 hours, it was poured into several volumes of water and the product was extracted with ether. The ethereal solution was washed with water, dried in contact with anhydrous sodium sulfate, and evaporated to dryness. This product was then heated with 100 parts of pyridine and 3.0 parts of succinic anhydride at reflux temperature for 2 hours. This reaction mixture was then poured into several volumes of water containing an amount of hydrochloric acid equivalent to the pyridine present. This water mixture was extracted with ether and the ethereal solution was then extracted with a 1% potassium carbonate solution in order to remove the half ester of succinic acid and methyl 9-hydroxydehydroabietate. The crude half ester was regenerated by pouring the potassium carbonate extract into water containing an equivalent amount of hydrochloric acid and then extracting this mixture with ether. The ethereal solution was washed, dried with anhydrous sodium sulfate and evaporated to dryness. The crude succinate so obtained was crystallized from aqueous acetone to obtain the crystalline half ester of succinic acid and methyl 9-hydroxydehydroabietate having a melting point of 142°–143° C.

*Example 4*

Fifteen parts of methyl dehydroabietate was oxidized with molecular oxygen in the presence of 0.750 part of benzoyl peroxide at 180° C. After 6.25 hours, the oxygen absorption amounted to 46.5 mole per cent and the oxidate contained 38.5 mole per cent of hydroperoxide. This oxidate was dissolved in 150 parts of methanol and the solution was treated with 200 parts of a solution of 3.1 parts of sodium sulfide in 200 parts of a 1:1 methanol:water mixture, following the procedure described in the foregoing example. The reaction mixture was poured into several volumes of water and the product was extracted with ether. The ethereal solution was dried and evaporated to dryness. The product was then heated with 100 parts of pyridine and 4.0 parts of succinic anhydride at reflux temperature for 2 hours. The half ester of methyl 9-hydroxydehydroabietate and succinic acid was recovered as described in the above example. This half ester was saponified by dissolving it in 50 parts of methanol, adding 50 parts of an aqueous methanol solution containing about 2 moles per liter of potassium hydroxide and then heating to reflux temperature for 20 minutes. The reaction mixture was poured into several volumes of water and the product was extracted with ether. The ether solution was dried and evaporated. On recrystallization from isooctane, there was obtained 3.4 parts of methyl 9-hydroxydehydroabietate having a melting point of 111°–112° C.

*Example 5*

Fifteen parts of an oxidate, obtained by oxidation of methyl dehydroabietate with molecular oxygen in the presence of benzoyl peroxide as described in the foregoing examples, was dissolved in 400 parts of isopropanol containing 50 parts of acetic acid. The solution was heated to boiling and 15 parts of sodium iodide was added. Heating was continued for 10 minutes after which the solution was cooled and a 20% aqueous sodium thiosulfate solution was added until the released iodine had been destroyed. The reaction mixture was then diluted with water and extracted with ether. The ethereal solution was washed consecutively with water, aqueous sodium thiosulfate, water, aqueous sodium bicarbonate, and water, and then was dried and evaporated to dryness.

The product so obtained was dissolved in 150 parts of pyridine containing 4.5 parts of succinic anhydride. The solution was heated at reflux temperature for 2 hours and then was poured into an excess of dilute hydrochloric acid. The aqueous mixture was extracted with ether. The ethereal solution was washed with water and then extracted with a 1% aqueous potassium carbonate solution. The crude half ester of succinic acid and methyl 9-hydroxydehydroabietic acid was regenerated by pouring the potassium carbonate extract into water containing an equivalent amount of hydrochloric acid, extracting with ether, and evaporating the ethereal solution to dryness. The crude succinate was then recrystallized from aqueous acetone whereupon a succinate was obtained as white needles having a melting point of 143°–144° C., neutral equivalent of 426 (theory=430) and a specific rotation of $[\alpha]_D + 25°$ (1% in ethanol). Treatment of this succinate with alcoholic potassium hydroxide at reflux temperature yielded methyl 9α-hydroxydehydroabietate having a melting point of 112° C.

The mother liquors from the above crystallization of the succinate from aqueous acetone yielded an oil when an attempt was made to obtain a second crop of succinate crystals. This oil had a neutral equivalent of 425, demonstrating that it was still a succinate of the same molecular weight. That it was the succinate half ester of the β-epimeride was demonstrated by isolating the succinate of a known sample of β-epimeride (prepared as described in Example 6), allowing an acetone solution of the succinate to evaporate to dryness whereupon white needles of the succinate were obtained, which yielded only an oil when an attempt was made to recrystallize the β-succinate from aqueous acetone.

*Example 6*

Methyl 9-oxodehydroabietate (611 parts) was hydrogenated in ethanol solution over a palladium-on-carbon catalyst at room temperature and atmospheric pressure to a per cent hydrogen absorption of 0.66 (theory for =CO to =CHOH is 0.61%). The ethanol solution was then filtered and the solvent removed by distillation.

The residue so obtained was dissolved in a solution of succinic anhydride (100 parts) in pyridine and the mixture was heated at reflux temperature for 2 hours. The pyridine was then removed and the residue dissolved in ether. The ethereal solution was freed of pyridine by extraction with 5% aqueous hydrochloric acid and then was extracted with 1% aqueous potassium carbonate. The carbonate extract was acidified and the precipitate dissolved in ether. The ethereal solution was washed until neutral, dried, and the ether removed whereby 681 parts of the half ester of succinic acid and 9β-hydroxydehydroabietate was obtained.

The above succinate was dissolved in a solution of potassium hydroxide (1000 parts) in methanol and heated at reflux temperature for 30 minutes. After cooling, the solution was diluted with water and the precipitate was dissolved in ether. This ethereal solution was washed with water, dried, and evaporated to dryness to yield 461 parts of crude product. On recrystallization from isooctane, heavy prisms of methyl 9β-hydroxydehydroabietate were obtained having a melting point of 92°–93° C. and carbon and hydrogen analyses in agreement with the theoretical amount of each. The specific rotation of this epimer was $[\alpha]_D + 56°$ (1% in ethanol).

The 3,5-dinitrobenzoate of this methyl 9β-hydroxydehydroabietate was prepared by reacting it with 3,5-dinitrobenzoyl chloride in pyridine solution. On recrystallization three times from ethanol, the 3,5-dinitrobenzoate had a constant melting point of 163°–164° C. A mixed melting point of this dinitrobenzoate with that prepared from the alcohol melting at 112°–112.5° C. (as prepared in Example 2) was depressed to 149°–152° C. The X-ray diffraction patterns of the two dinitrobenzoates were radically different, also demonstrating that the 9α- and 9β-compounds are not identical.

*Example 7*

Fifteen parts of ethyl dehydroabietate was oxidized with molecular oxygen in the presence of 0.750 part of benzoyl peroxide at 80° C. After 6.25 hours, the ester had absorbed 37.7 mole per cent of oxygen and on analysis the oxidate was found to contain 40.3% of hydroperoxide.

A portion of this oxidate (13.2 parts) was dissolved in 150 parts of methanol and 100 parts of a 1:1 methanol:water solution containing 4.0 parts of sodium sulfide was added to the agitated solution during 1.5 hours, after which the reaction mixture was heated to reflux temperature for 1.5 hours. Then the reaction mixture was poured into several volumes of water and the product was extracted with ether. The ethereal solution was washed with water, dried with anhydrous sodium sulfate and evaporated to dryness. This product was then heated with 100 parts of pyridine and 3.0 parts of succinic anhydride as described in the foregoing examples to produce the half ester. The half ester of succinic acid and ethyl 9-hydroxydehydroabietate so produced was isolated (4.5 parts) but could not be crystallized.

*Example 8*

The methyl 9-hydroxydehydroabietate having a melting point of 112° C. was saponified by dissolving 1 part of it in 50 parts of diethylene glycol admixed with 2.0 parts of sodium hydroxide dissolved in the minimum amount of water. This solution was heated at reflux temperature for 3 hours and then was poured into several volumes of water. The free acid was recovered by extraction of this water mixture with ether. On recrystallization from a mixture of hexane and benzene, the 9-hydroxydehydroabietic acid was obtained in the form of white platelets which had a melting point of 178.5°–179.5° C. The neutral equivalent of the acid was determined and found to be 316, which is in exact agreement with the calculated value. It is soluble in aqueous alkali and such organic solvents as ether, benzene, methanol, ethanol, and acetone.

In accordance with this invention, esters of 9-hydroxydehydroabietic acid may be prepared by oxidizing an ester of dehydroabietic acid in the liquid phase with oxygen to produce an oxidate containing the ester of 9-hydroperoxydehydroabietic acid and reducing the hydroperoxy group to the hydroxyl radical by contacting the hydroperoxide with a nonmetallic reducing agent. The free acid, 9-hydroxydehydroabietic acid, may then be obtained by saponification of the alkyl 9-hydroxydehydroabietates.

The esters of dehydroabietic acid which are oxidized to the hydroperoxide which in turn is reduced to the alcohol may be prepared from dehydroabietic acid by any of the methods commonly employed in the production of carboxylic acid esters, as, for example, esterification of the acid with an alcohol under pressure or of the acid chloride with an alcohol or by heating an alkali metal salt of the acid with an alkyl halide. The dehydroabietic acid which is esterified is readily obtained from a dehydrogenated or disproportionated rosin by solvent extraction. Instead of using the pure ester, an ester of commercial dehydrogenated rosin may be used or an ester of rosin may be dehydrogenated and used.

While the foregoing examples have shown the oxidation and subsequent reduction of the oxidized product in accordance with this invention as applied to methyl and ethyl dehydroabietates, the process is equally applicable to any other alkyl, hydroxyalkyl, aryl, or aralkyl dehydroabietate, as, for example, propyl, butyl, hydroxyethyl, glycerol, benzyl, etc., dehydroabietates.

The oxidation of the dehydroabietic acid esters to produce the 9-hydroperoxydehydroabietates is carried out by passing an oxygen-containing gas through the ester in the liquid state, either molten or dissolved in an inert solvent. Any gas containing free oxygen may be used for carrying out the oxidation, as, for example, molecular oxygen or air. The temperature at which the oxidation is carried out will depend upon the reaction conditions. For example, if it is carried out in the absence of a solvent, the temperature must be at least that of the melting point of the ester being oxidized, as, for example, above about 62° C. in the case of methyl dehydroabietate, etc. If a solution of the ester is used for carrying out the oxidation reaction, as, for example, in tertiary butylbenzene, lower temperatures may be used for the oxidation. The maximum temperature at which the oxidation is carried out is that at which the hydroperoxide will decompose. In general, the oxidation is carried out at temperatures between about 60° C. and 130° C., and preferably between about 65° C. and about 100° C., a particularly advantageous range being between about 70° C. and 90° C. The oxidation is usually carried out at about atmospheric pressure. However, if desired, superatmospheric pressures may be used.

The oxidation of the dehydroabietic acid ester is preferably carried out in the presence of a free radical oxidation initiator; i. e., a material which undergoes thermal decomposition to form free radicals under the reaction conditions. Of particular value are the peroxidic free radical oxidation initiators such as organic peroxides and organic hydroperoxides which form free radicals under the reaction conditions. Exemplary of the organic peroxides which may be used to initiate the oxidation reaction are the acyl peroxides such as acetyl peroxide, benzoyl peroxide, etc., alkyl peroxides such as tert-butyl peroxide, methyl ethyl peroxide, etc. Exemplary of the organic hydroperoxides which may be used to initiate the oxidation reaction are the alkyl hydroperoxides such as tert-butyl hydroperoxide, and alkyl aryl and alkyl cycloalkyl hydroperoxides such as diphenylmethyl hydroperoxide, α,α-dimethyl benzyl hydroperoxide, α,α-dimethyl-p-isopropylbenzene hydroperoxide, methylcyclohexyl hydroperoxide, tetralin hydroperoxide, naphthene hydroperoxide, etc. When using the free radical oxidation initiators, an amount of from about 0.1% to about 20%, and preferably from about 0.3% to about 10%, is added to the dehydroabietic acid ester being oxidized.

The oxidate so produced and containing the ester of 9-hydroperoxydehydroabietic acid may be subjected to the reduction reaction in accordance with this invention or the 9-hydroperoxydehydroabietate may be separated from the oxidate and then reduced. If the pure hydroperoxide is desired, it may be obtained from the crude oxidation product, referred to as the oxidate, by countercurrent solvent extraction or any other extractive procedure. Examples of solvent combinations which may be used for the countercurrent extraction are aqueous methanol, ethanol, dioxane, etc., solutions with aliphatic or alicyclic hydrocarbon solvents such as hexane, heptane, isooctane, cyclohexane, etc.

The reduction of the 9-hydroperoxydehydroabietic acid ester to the corresponding 9-hydroxy derivative is readily carried out by contacting the hydroperoxide with a nonmetallic reducing agent. These reducing agents are vigorous enough to reduce the hydroperoxy group to the hydroxyl group without at the same time reducing the ester group or the benzenoid nucleus. By the term "nonmetallic reducing agent" is meant compounds of nonmetals which exist in more than one valence state and in which the nonmetal is present in one of its lower valence states and is capable of being oxidized to one of its higher valence states. Such nonmetallic reducing agents are the sulfide, mono- di-, and poly-sulfide and mixtures thereof, sulfite, bisulfite, iodide, etc., anions. The nonmetallic reducing agent is preferably a water-soluble salt such as the alkali metal, alkaline earth metal, and ammonium salts of these nonmetallic reducing anions.

The reduction of the 9-hydroperoxydehydroabietate, or the oxidate containing the hydroperoxide, in accordance with this invention is preferably carried out in solution. Any inert solvent may be used for carrying out the reduction reaction but is preferably a polar solvent; i. e., one in which ionization is possible. The examples have shown the use of aqueous methanol and, in the case of sodium iodide as the reducing agent, isopropanol containing a small amount of acetic acid. Any other solvent in which both the hydroperoxide and reducing agent are soluble may be used as, for example, aqueous ethanol, propanol, isopropanol, acetone, dioxane, etc. The amount of solvent used may be varied over a wide range but should be sufficient to insure that the reaction mixture is homogeneous. Usually the hydroperoxide is dissolved in an amount of solvent to obtain a solution of about 1% to about 10% concentration. The reducing agent is likewise usually added as a solution containing from about 1% to about 10% of the reducing agent, although any concentration up to a saturated solution of the reducing agent may be used. When an aqueous solvent is used, the water content of the solvent may be varied over a wide range, up to the point at which the hydroperoxide is insoluble, but usually is in the order of about 10% to about 25%. In the same way, when an acid is added, as, for example, acetic acid, along with an iodide reducing agent, the amount of acid added may be varied but is usually from about 2% to about 10% of the solvent.

The 9-hydroperoxydehydroabietates are secondary hydroperoxides but they do not readily undergo thermal decomposition. However, when contacted with a nonmetallic reducing agent, the alcohol is produced easily and in high yields. Just how the nonmetallic reducing agent functions to decompose these hydroperoxides to the alcohol is not known. If a sufficient quantity of the nonmetallic reducing agent is added to provide two electrons for each hydroperoxy radical, it may be assumed that a straight oxidation-reduction reaction has occurred. However, if it were merely a case of the nonmetallic ion acting as a reducing agent, then any reducing agent should be operable, but this is not the case, for when a 9-hydroperoxydehydroabietate is contacted with a metallic reducing agent, the hydroperoxy radical is reduced to a keto group to yield a 9-oxodehydroabietate. Furthermore, less than the amount of the metallic reducing agent necessary to furnish two electrons per hydroperoxy group may be used and still obtain the alcohol. Thus, the reaction appears to be a reduction reaction in which the nonmetallic ion functions as a catalyst for the reduction reaction rather than as the actual reducing agent. Consequently, the amount of nonmetallic reducing agent used in the process of this invention may be varied from a catalytic amount to an amount sufficient to provide two electrons for each hydroperoxy radical to be reduced to the alcohol group. Greater amounts of the nonmetallic reducing agent may be used, if desired. Preferably, the amount of metallic reducing agent employed is at least such as to provide the two electrons necessary to reduce the hydroperoxide group to the hydroxyl group.

The temperature at which the reduction reaction is carried out will depend in some degree on the reducing agent being used, the solvent, etc. For example, with an alkali metal sulfide in aqueous methanol, the reaction is readily carried out at room temperature or slightly above, as, for example, from about 20° C. to about 50° C. although higher temperatures may be utilized. In the case of sodium iodide and acetic acid as the reducing agent, the reaction may be carried out at any temperature up to the boiling point of the solvent. In general, a temperature of from about 0° C. to about 100° C. may be used and preferably is from about 20° C. to about 100° C.

The method by which the 9-hydroxydehydroabietate is recovered from the reaction mixture will depend upon the type of reducing process used in preparing it. Usually, it is most easily isolated by pouring the reaction mixture into a large excess of water and then extracting the 9-hydroxydehydroabietate with a solvent such as ether, benzene, etc. However, if the reduction was carried out in an anhydrous organic solvent, the 9-hydroxydehydroabietate may be recovered by simply removing the organic solvent. The esters of 9-hydroxydehydroabietic acid which are crystalline compounds may be purified by recrystallization from an organic solvent, such as petroleum ether, aqueous methanol, etc.

The esters of 9-hydroxydehydroabietic acid may also be prepared by the controlled reduction of esters of 9-oxodehydroabietic acid, as, for example, hydrogenation in neutral solution, as in ethanol, over a noble metal catalyst such as palladium-on-carbon. However, it has been found that the product so obtained consists of a single epimer, called herein the $\beta$-epimer or cis epimer, whereas that obtained from the hydroperoxide is a mixture of the trans and cis epimers in which the trans epimer predominates. To demonstrate the existence of two epimeric forms of these compounds, the two epimers of methyl 9-hydroxydehydroabietate were prepared and compared. The one obtained as the major product from the hydroperoxide has a melting point of 112°–112.5° C. and a specific rotation (1% ethanol) of $[\alpha]_D +17°$ whereas the one obtained from the ketone has a melting point of 92°–93° C. and a specific rotation (1% ethanol) of $[\alpha]_D +56°$. A mixed melting point of the two is depressed to 82° C. The melting point of the 3,5-dinitrobenzoate of both the $\alpha$- and $\beta$-epimers is the same (163°–164° C.), but a mixed melting point of the two is depressed to 149°–152° C. The X-ray diffraction patterns of the two dinitrobenzoates also differ.

That the hydroxyl group of the new hydroxydehydroabietic acid and esters thereof obtained from the hydroperoxide is in the 9-position and has the structural formula set forth above was determined by identifying the hydroperoxide from which it was prepared. The hydroperoxydehydroabietate reduced in accordance with this invention was one in which the hydroperoxide group was in the 9-position. This was proved by the fact that on reduction of this hydroperoxide to the ketone, the keto group was in a conjugate position with respect to the unsaturation of the benzenoid nucleus of the dehydroabietic acid. Therefore, it must be in either the 9- or the 14-position. That it was not in the latter position was shown by the fact that this ketone gave a negative iodoform test. Accordingly, the keto group was shown to be in the 9-position and consequently so also was the hydroperoxy group from which it was prepared. Since the hydroxy derivative was prepared from the 9-hydroperoxy compound, it follows that the hydroxyl radical is in the 9-position.

The free acid, 9-hydroxydehydroabietic acid, is readily obtained from the alkyl 9-hydroxydehydroabietates by saponification. Any of the usual methods of carrying out the saponification normally employed in the preparation of an acid from an ester may be used. As in the case of the esters, the free acid also exists in two epimeric forms.

The new products of this invention, having a hydroxyl group in the 9-position of the dehydroabietic acid nucleus, are important intermediates in the synthesis of valuable new derivatives of the resin acids and are of particular value as intermediates in the synthesis of pharmaceutical materials. The hydroxyl group in the 9-position will undergo the usual etherification and esterfication reactions. However, an outstanding utility of these new 9-hydroxydehydroabietic acid derivatives is their use as intermediates in the production of octahydro-7,9-dihydroxy-1,4a-dimethyl-1-phenanthrenecarboxylic acid and esters thereof and octahydro-7-hydroxy-1,4a-dimethyl-9-oxo-1-phenanthrenecarboxylic acid and esters thereof. The first of these products is produced by oxidation of an ester of 9-hydroxydehydroabietic acid with oxygen in the presence of a peroxide catalyst whereby the ester of 14-hydroperoxy-9-hydroxydehydroabietic acid is produced which when treated with an acid catalyst yields octahydro-7,9 - dihydroxy-1,4a - dimethyl - 1 - phenanthrenecarboxylic acid. Some of the octahydro-7-hydroxy-1,4a-dimethyl-9-oxo-1-phenanthrenecarboxylic acid may also be produced. The latter product can also be obtained from the 9-hydroxydehydroabietic acid derivatives by treatment with pyridine and tosyl chloride to form the 9-pyridinium tosylate, oxidation thereof to the 14-hydroperoxy - 9 - hydroxydehydroabietate pyridinium tosylate which when treated with an acid catalyst yields the ester of octahydro-7-hydroxy-1,4a-dimethyl - 1 - phenanthrenecarboxylic acid-9-pyridinium tosylate. This product when treated with nitrosodimethylaniline and then hydrolyzed yields the ester of octahydro-7-hydroxy-1,4a-dimethyl-9-oxo-1-phenanthrenecarboxylic acid. Another group of valuable compounds which may be produced from the 9-hydroxydehydroabietates are esters of 9-(N-piperidyl)-dehydroabietic acid. These amino esters are prepared by forming the 9-pyridinium tosylate and subjecting it to catalytic hydrogenation. Many other uses for these new resin acid derivatives will be readily apparent to those skilled in the art.

This application is a continuation-in-part of my co-pending application Serial Number 225,283, filed May 8, 1951, now abandoned.

What I claim and desire to protect by Letters Patent is:

1. A dehydroabietic acid derivative selected from the group consisting of 9-hydroxydehydroabietic acid and lower alkyl esters thereof.
2. A lower alkyl ester of 9-hydroxydehydroabietic acid.
3. 9-hydroxydehydroabietic acid.
4. Methyl 9-hydroxydehydroabietate.
5. Ethyl 9-hydroxydehydroabietate.
6. The process of preparing a lower alkyl ester of 9-hydroxydehydroabietic acid which comprises oxidizing a lower alkyl ester of dehydroabietic acid in liquid phase with a gas containing free oxygen in the presence of a free radical oxidation initiator and contacting the 9-hydroperoxydehydroabietate so obtained with a nonmetallic reducing agent at a temperature of from about 0° C. to about 100° C. to form the said ester of 9-hydroxydehydroabietic acid, said nonmetallic reducing agent being selected from the group consisting of water-soluble alkali metal, alkaline earth metal, and ammonium sulfides, sulfites, bisulfites, and iodides.
7. The process of preparing methyl 9-hydroxydehydroabietic acid which comprises oxidizing methyl dehydroabietate in liquid phase with a gas containing free oxygen in the presence of a free radical oxidation initiator to produce an oxidate containing methyl 9-hydroperoxydehydroabietate and contacting said hydroperoxide with a nonmetallic reducing agent at a temperature of from about 0° C. to about 100° C., to form the methyl 9-hydroxydehydroabietate, said nonmetallic reducing agent being selected from the group consisting of water-soluble alkali metal, alkaline earth metal, and ammonium sulfides, sulfites, bisulfites, and iodides.
8. The process of preparing a lower alkyl ester of 9-hydroxydehydroabietic acid which comprises contacting a lower alkyl ester of 9-hydroperoxydehydroabietic acid with a nonmetallic reducing agent at a temperature of from about 0° C. to about 100° C., said nonmetallic reducing agent being selected from the group consisting of water-soluble alkali metal, alkaline earth metal, and ammonium sulfides, sulfites, bisulfites, and iodides.
9. The process of preparing methyl 9-hydroxydehydroabietate which comprises contacting methyl 9-hydroperoxydehydroabietate with a nonmetallic reducing agent at a temperature of from about 0° C. to about 100° C., said nonmetallic reducing agent being selected from the group consisting of water-soluble alkali metal, alkaline earth metal, and ammonium sulfides, sulfites, bisulfites, and iodides.
10. The process of preparing ethyl 9-hydroxydehydroabietate which comprises contacting ethyl 9-hydroperoxydehydroabietate with a nonmetallic reducing agent at a temperature of from about 0° C. to about 100° C., said nonmetallic reducing agent being selected from the group consisting of water-soluble alkali metal, alkaline earth metal, and ammonium sulfides, sulfites, bisulfites, and iodides.
11. The process of preparing methyl 9-hydroxydehydroxyabietate which comprises contacting methyl 9-hydroperoxydehydroabietate with an alkali metal iodide at a temperature of from about 20° C. to about 100° C.
12. The process of preparing methyl 9-hydroxydehydroabietate which comprises contacting methyl 9-hydroperoxydehydroabietate with an alkali metal sulfide at a temperature of from about 20° C. to about 50° C.
13. The process of preparing ethyl 9-hydroxydehydroabietate which comprises contacting ethyl 9-hydroperoxydehydroabietate with an alkali metal sulfide at a temperature of from about 20° C. to about 50° C.

References Cited in the file of this patent

UNITED STATES PATENTS

| | | |
|---|---|---|
| 2,201,237 | Littmann | May 21, 1940 |
| 2,434,643 | Drake | Jan. 20, 1948 |
| 2,484,841 | Lorand | Oct. 18, 1949 |
| 2,656,343 | Ritchie | Oct. 20, 1953 |
| 2,656,344 | Ritchie | Oct. 20, 1953 |
| 2,703,809 | Ritchie | Mar. 8, 1955 |